Dec. 21, 1926.

C. L. SONEN 1,611,567

ROTATABLE BAR AND BEARING AND METHOD OF MOUNTING SAME

Original Filed May 17, 1918

INVENTOR
Clayton L. Sonen
BY
Clifford E. Dunn
ATTORNEY

Patented Dec. 21, 1926.

1,611,567

UNITED STATES PATENT OFFICE.

CLAYTON L. SONEN, OF DETROIT, MICHIGAN, ASSIGNOR TO SQUARE D COMPANY, OF DETROIT, MICHIGAN, A CORPORATION OF MICHIGAN.

ROTATABLE BAR AND BEARING AND METHOD OF MOUNTING SAME.

Application filed May 17, 1918, Serial No. 235,219. Renewed February 10, 1923.

My invention relates to rotatably mounted shafts or bars and is directed primarily to the method of preventing lateral motion thereof.

It frequently happens that in drilling a bar or shaft to receive a split pin, a great number of drills are broken because of the round surface against which they are to be started. These drill holes are thereafter used to secure a split pin in place to thereby position the shaft or bar against longitudinal motion. It is to overcome these difficulties and to materially shorten the time required to suitably mount a bar or shaft in a bearing against longitudinal motion that the present invention is designed.

It is therefore one of the objects of the present invention to provide a method for securing a shaft or bar in its bearing against longitudinal motion in a very quick and simple manner.

It is a further object of this invention to lessen the number of operations required in rotatably securing a shaft or bar in a bearing against longitudinal motion.

It is a further object of this invention to provide means whereby an integral bar with an intermediate crank may be pivotally or rotatably mounted in the two sides of a box or casing without distorting the box or bar.

Figure 1:
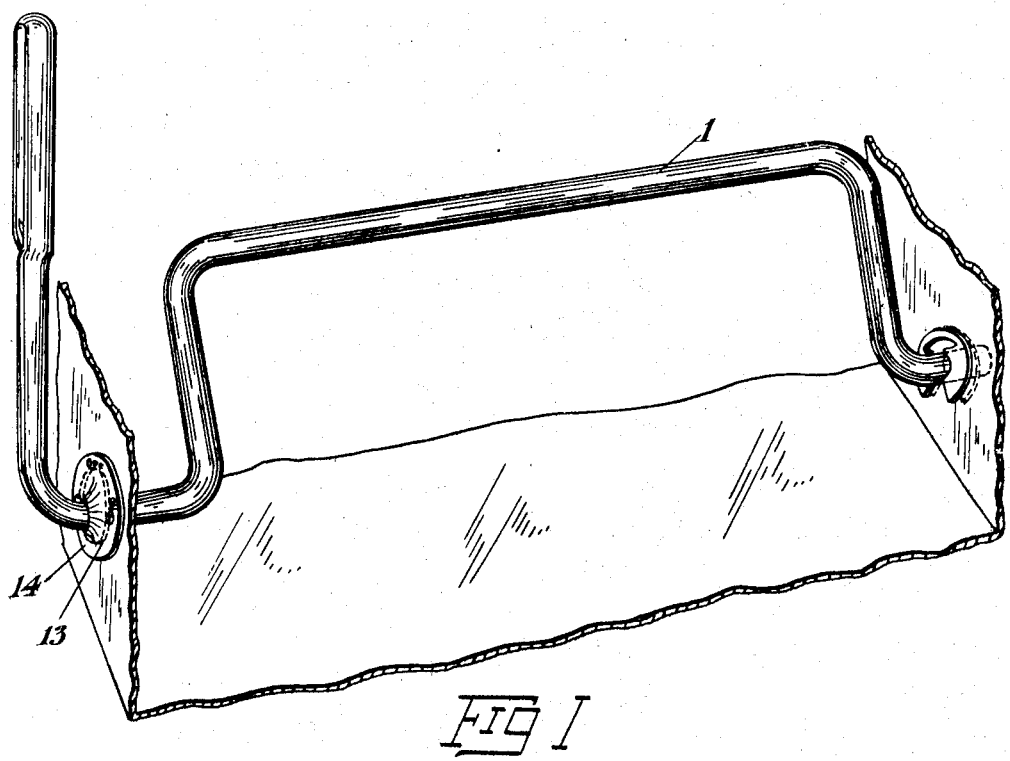
Figure 6:
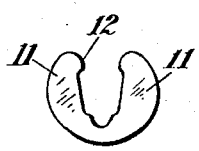
Figure 4:
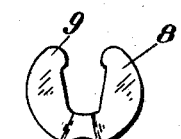
Figure 2:
Figure 7:
Figure 5:
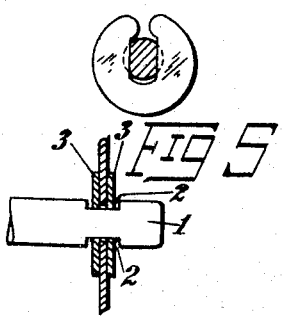
Figure 8:
Figure 3:
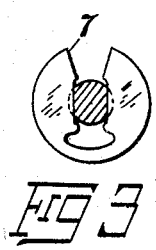

Referring to the drawing in which is shown one of the many possible forms that this invention may take, Fig. 1 is a fragmentary elevation of the crank bar mounted in a box or casing in accordance with my invention, Fig. 2 represents one of the clamping discs or securing members, as it appears when it is free from the bar, Fig. 3 shows the clamping member of Fig. 2, clamped in position on the bar, Fig. 4 shows a second form of clamping disc, Fig. 5 shows the device of Fig. 4 suitably clamped in position upon a bar, Fig. 6 shows a third form of clamping disc, Fig. 7 shows the device of Fig. 6 clamped in position on the bar, Fig. 8 is a transverse sectional view of the bar, adjacent the right hand bearing of Fig. 1, Fig. 9 is a view of the right-hand side of the bar of Fig. 1 with a portion of the box and the clamping members shown in section.

The device chosen for illustration in Fig. 1 is a cranked operating member of an electrical switch pivotally mounted in the enclosing casing. It is to be understood, however, that this invention is not limited to an electrical switch operating crank, but this particular embodiment has been selected merely as an illustration of one of the many possible uses to which this invention may be put.

In the embodiment chosen for illustration, the bearing member consists of a portion of the side of the casing. Adjacent this portion the bar or shaft 1 is slotted on each side in such a manner that comparatively wide slots 2 are formed, as may be seen from reference to Figs. 8 and 9.

The clamping device shown in Fig. 2 consists of an inherently springy member or clamping disc 3 of substantially U shape or pronged construction. This member 3 has juxtaposed faces formed on the inner sides of the arms thereof, as shown at 4. Lugs 5 and 6 are provided adjacent the outer and inner portions of the arms of this U shaped clamping disc. These lugs are designed to position such clamping disc upon the shaft or bar 1 with the flat faces 4 in contact with the bottom of the opposed slots 2 of the bar or shaft.

It will be noted from reference to Figs. 2 and 3 that the outer portions of the opposing faces of the arms of this U-shaped member are beveled whereby in positioning such member upon the bar these beveled faces 7 are adapted to ride upon the bar and force the arms apart to aid in positioning such clamping discs upon the bar.

Upon reference to Figs. 1 and 9 it will be noted that one of these clamping discs is used on each side of the bearing member, both of such clamping discs engaging in the same opposing relatively wide slots 2.

The second form of clamping disc is shown in Figs. 4 and 5 and comprises a U shaped member having arms 8 which are in the position shown in Fig. 4 slightly flaring and are provided at their outer sides with inwardly projecting positioning lugs 9. This flaring of the arms 8 is secured by means of an upstruck portion 10 in the center or base portion of the U shaped member. When it is desired to position this type of clamping disc upon the bar, such disc due to the flaring position of the arms is readily slipped over the bar and is clamped in position thereon by flattening the upstruck portion 10 which forces the arms 8 towards each other and thereby securely positions the clamping disc upon the bar.

The third form of clamping disc is shown in Figs. 6 and 7. This disc comprises a U shaped member having slightly flaring arms 11 corresponding to the arms 8 of Fig. 4 and provided with inwardly projecting positioning lugs 12 in a similar manner and for a similar purpose. This disc is not inherently springy and is clamped in position by forcing the arms 11 towards each other, as shown in Fig. 7, to thereby clamp the bar 1 between such arms. The material of which this disc is composed is such that the disc will retain this clamped position permanently.

It will be seen that a very efficient mode of securing a bar or shaft rotatably in a bearing against longitudinal motion has been provided by the three means described above. It will also be understood that the opposing slots 2 and the bar 1 may be readily formed without danger of breaking the tool or clamping member. This mode of operation is designed to replace the tedious and relatively difficult mode at present used in securing bars of shafts of this type which comprises drilling such bar by a relatively small highly tempered drill. In drilling round bars it is difficult to start the drill with certainty and be assured of the drill not breaking due to the round face against which the drill operates in starting. It is obvious that these opposing slots 2 may be filed, shaped or milled in place or otherwise readily formed on the bar 1 by relatively large and sturdy operating members or tools whereby the danger of breakage of the tool used will be reduced to a minimum.

A further feature of this invention contemplates the positioning of a bar having an integral crank in the central portion thereof in a casing or box which is relatively inflexible or may not be distorted to spring such bar into place. This is secured by forming one side of the casing with a relatively large opening 13, as shown on the left-hand side of Fig. 1 whereby it is possible to insert the crank bar 1 and pass the elbows thereof readily through such large opening 13. Prior to the insertion of the crank bar 1 a bearing support or washer 14 is slipped upon such bar and upon the final positioning of such bar 1 this bearing member or washer 14 is permanently riveted or otherwise secured in place. The opposite bearing, that is to say, the right-hand side, as shown in Fig. 1 may comprise a hole of just sufficient size to readily accommodate the bar 1 and form a suitable bearing therefor.

After the bar 1 has been placed in operative position, as shown, the clamping discs of any of the three types may then be applied. It is to be noted that one clamping disc is applied on each side of the bearing member whereby longitudinal motion in both directions is prevented.

It may be desirable in the case of an electrical switch to stamp or engrave upon the bearing member 14 the suitable indicating words, such as "On" or "Off", and this may readily be accomplished upon a bearing washer or member of the type shown at 14 with a great deal more facility than could have been accomplished upon the side of the box or casing.

From the above description it will be noted that applicant has provided a very simple and efficacious method of rotatably securing a bar in a bearing against longitudinal motion.

The above description and the drawings are to be interpreted in an illustrative manner and not in a limiting manner as the invention is of broad scope and is only to be limited as defined in the appended claims.

I claim—

1. The method of rotatably securing a bar to a bearing member comprising forming opposing slots in said bar, inserting a U shaped clamping member, having an upstruck portion in said slots, and clamping said clamping member upon the bar by flattening said upstruck portion whereby the bar is gripped by said U shaped clamping member and longitudinal motion of the bar prevented.

2. As a new article of manufacture, a substitute for a split pin comprising a U shaped clamping disc having a central upstruck portion, and juxtaposed faces having positioning lugs thereon, said upstruck portion being adapted to be subsequently flattened to thereby clamp said U shaped member in position.

CLAYTON L. SONEN.